United States Patent
Klots et al.

(10) Patent No.: US 6,173,313 B1
(45) Date of Patent: Jan. 9, 2001

(54) METHODOLOGY FOR HOSTING DISTRIBUTED OBJECTS AT A PREDETERMINED NODE IN A DISTRIBUTED SYSTEM

(75) Inventors: Boris Klots, Belmont; Amit Ganesh, Mountain View; Roger J. Bamford, San Francisco, all of CA (US)

(73) Assignee: Oracle Corporation, Redwood Shores, CA (US)

(*) Notice: Under 35 U.S.C. 154(b), the term of this patent shall be extended for 0 days.

(21) Appl. No.: 09/103,546

(22) Filed: Jun. 24, 1998

(51) Int. Cl.[7] .............................. G06F 15/16; G06F 7/00
(52) U.S. Cl. ............................................. 709/203; 707/100
(58) Field of Search ................................... 709/203, 217; 707/227, 100

(56) References Cited

U.S. PATENT DOCUMENTS

| | | | |
|---|---|---|---|
| 5,029,104 | * 7/1991 | Dodson et al. | 709/217 |
| 5,774,721 | * 6/1998 | Robinson | 709/303 |
| 5,793,965 | * 8/1998 | Vanderbilt et al. | 709/203 |
| 5,802,291 | * 9/1998 | Balick et al. | 709/202 |
| 5,857,102 | * 1/1999 | McChesney et al. | 713/100 |
| 5,881,268 | * 3/1999 | McDonald et al. | 395/500.44 |
| 6,014,702 | * 1/2000 | King et al. | 709/227 |

* cited by examiner

Primary Examiner—Krisna Lim
(74) Attorney, Agent, or Firm—McDermott, Will & Emery (57) ABSTRACT

A distributed object is hosted in a distributed system by invoking a global hash function on a generated name for the distributed object. The name for the distributed object is generated with knowledge of the global hash function so that the result of invoking the global hash function upon the name results in the selection of a predetermined node in the distributed system. The predetermined node may be selected based on the affinity of the node to the distributed object for reducing network messaging and communications overhead.

42 Claims, 3 Drawing Sheets

METHODOLOGY FOR HOSTING DISTRIBUTED OBJECTS AT A PREDETERMINED NODE IN A DISTRIBUTED SYSTEM

FIELD OF THE INVENTION

The present invention relates to distributed systems and more particularly to hosting a distributed object at a node in a distributed system.

BACKGROUND OF THE INVENTION

A distributed system is a network of interconnected computers or processors, each of which is called a "node." A distributed object is a resource or other entity that is available to a plurality of nodes in the distributed system. Examples of distributed objects include a resource such as a printer or lock request queue, a body of data such as a table in a relational database, and a thread, which contains executable instructions and program state. A distributed object, or each partition thereof, is located or "hosted" at a particular "host" node in the distributed system. For example, a distributed object that contains state is hosted at the node in the distributed system that provides memory to store the state information. Since a distributed object is available to other nodes in the distributed system, the distributed object, for example, can be created by one node in the distributed system to be hosted at another node, accessed by yet another node, and modified by still another node.

Typically, distributed objects are identified by their "name," which is a string of bits or other values such as ASCII characters. In order for a process executing at one node in a distributed system to use a distributed object, that process "resolves" the name of the distributed object to determine the location, i.e. the host node, of the distributed object. If the host node is the same node as that of the process, then the process can access the distributed object quickly and cheaply by interprocess communication techniques such as shared memory, named pipes, semaphores, and the like. On the other hand, if the distributed object is hosted at another node, then the process accesses the distributed object more slowly and expensively over a network connection, as by making a remote procedure call, establishing a TCP/IP link, passing a message and the like. It is thus desirable to host the distributed object at a node that has an affinity to the distributed object, for example, at the node that is executing most of the processes that are accessing the distributed object. Most accesses to the distributed object, when hosted at the node with an affinity thereto, are performed over the cheaper interprocess communications rather than the more expensive networking communications.

A distributed object is associated with both a name and a location. The process of converting a name of a distributed object into the location of the distributed object is called "name resolution" and depends on a particular "name clustering" strategy. One popular strategy, termed herein "syntactic clustering," is to couple the name of the host node to the name of distributed objects located at the host. A typical example is the "URL," the Uniform Resource Locator for the World Wide Web. A URL syntactically embeds the name of the host node in the name of the web object. For example, a URL for a home page on the World Wide Web of "http://www.foo.com/~bar/index.html" includes the substring "www.foo.com" for the name of the host machine. Syntactic name resolution accordingly involves parsing the name of the distributed object to determine the location of the distributed object.

A major disadvantage to syntactic clustering is apparent in reconfigurable distributed systems, especially in resilient or fault-tolerant networks, wherein a distributed object is able to survive the death of its host node, as by crashing or hanging. When a node is removed from such a distributed system, the distributed objects hosted at the node must be redistributed to other nodes in the distributed system. If the name of the host is syntactically encoded in the name of the distributed objects, the names of the redistributed objects are invalid after the redistribution, because they still identify the dead node. Therefore, processes accessing the relocated distributed objects can no longer locate them by the invalid names.

One conventional attempt to address the reconfiguration issue, termed "attribute clustering," is to provide an extra level of indirection in the naming scheme. Accordingly, the name of a distributed object does not directly encode the location of the distributed object, but is an attribute in a data structure such as a name table that stores the location of the distributed object. Name resolution in an attribute clustering scheme involves looking up the name in a table for an entry that includes a portion of the name and the corresponding location of the distributed object. When the distributed system is reconfigured, as by adding or removing a node, the name table must be updated to indicate the new host locations for the distributed objects.

Attribute clustering, however, entails several drawbacks. For example, this approach involves the creation of a very large data structure, which is time-consuming to search. Creation and deletion of distributed objects involves adding and removing entries in the name table, which is slow for large numbers of distributed objects and, hence, huge name tables. Furthermore, it is expensive to provide a copy of a huge name table at every site. One approach is to partition the name table and distribute portions of the table across the distributed system, in effect making the same table a distributed object, thereby increasing overhead in name resolution, because the relevant portions of the name table are often located often at another site.

In an "algorithmic clustering" approach, distributed objects are hosted at nodes based on the result of applying a global hash function to their respective names. Thus, the host node is independent of the name of the distributed object. When the distributed system is reconfigured, a new hash function is generated for the new configuration and the distributed objects of the distributed system are rehosted based upon the results of applying the new hash function to the names of the distributed objects. Since a distributed object is always located by hashing the name of the distributed object, the name of distributed object is still valid after reconfiguration. The major disadvantage of the algorithmic clustering approach is that a distributed object is usually not hosted at the node that has the most affinity to the distributed object. Thus, most of the accesses to the distributed object have to be performed by messages transmitted over a network channel. Consequently, the algorithmic clustering techniques involve high network communications overhead.

Therefore, conventional hosting methodologies are characterized by a Hobson's choice between efficiency and resiliency. Conventional syntactic clustering techniques are able to host a distributed object at the node having the most affinity for access efficiency but are incapable of efficiently redistributing the distributed object if the host node is removed. Conventional algorithmic clustering techniques are capable of redistributing distributed object after a reconfiguration of the distributed system but fail to locate distributed object at the nodes that have affinity thereto, respectively. Conventional attribute clustering techniques, which are capable of hosting the distributed object at a node having an affinity thereto and redistributing the hosted objects, are impractical because of high overhead in hosting maintenance and name resolution.

SUMMARY OF THE INVENTION

What is needed is a resilient and efficient system and methodology for hosting distributed objects. There exists a need for a hosting methodology capable of hosting distributed objects at predetermined nodes, e.g. nodes having an affinity to the distributed system, respectively. There is also a need for a hosting methodology capable of relocating distributed objects in response to a change in the configuration of a distributed system. There is a further need for a low-overhead hosting methodology.

These and another needs are met by the present invention in which a distributed object is hosted based on a hash function applied to a specifically generated name of the distributed object. The name for the distributed object is generated so that the hash function indicates a predetermined node in the distributed system. By generating a name for a distributed object so that an invocation of the hash function yields the predetermined node, a distributed object can be hosted at the node that has the most affinity to the distributed object. However, since the distributed object is located by applying the hash function to its name, the distributed object can easily be redistributed after a reconfiguration by modifying the hash function.

One aspect of the invention is a computer-implemented method and a computer-readable medium bearing instructions arranged for hosting a distributed object at a predetermined node within a distributed system of at least two nodes. Accordingly, a name is generated for the distributed object such that an invocation of a hash function upon the name indicates that the distributed object is to be hosted at the predetermined node. The distributed object is hosted at the predetermined node based on the hash function and the name for the distributed object, as by invoking the hash function upon the name. In accordance with another aspect of the present invention, a new hash function is generated in response to a change in a configuration of the distributed system and invoked to host the distributed object at a new node.

According to another aspect of the present invention, the name for the distributed object is generated by determining bit values such that an invocation of the hash function upon a concatenation of a base name for the distributed object and the bit values indicates that the distributed object is to be hosted at the predetermined node. The name for the distributed object is produced by concatenating the base name for the distributed object and the bit values. The bit values can be generated by a predictive approach based on knowledge of the hash function, the predetermined node and the base name or by repeatedly generating bit values until the hash function produces the desired result.

The present invention has been found to be particularly advantageous for distributed locks maintained by a distributed lock manager. Accordingly, another aspect of the invention is a computer-implemented method and a computer-readable medium bearing instructions for locking a resource within a networked, relational database system of more than one node. A node is selected from among said plurality of nodes, and a name is generated for a lock for the resource such that an invocation of a hash function upon the name indicates an instance of a distributed lock manager at the selected node. A lock request containing the generated name is enqueued in the instance of the distributed lock manager based on the hash function and the generated name.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENTS

A method and apparatus for hosting distributed objects are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
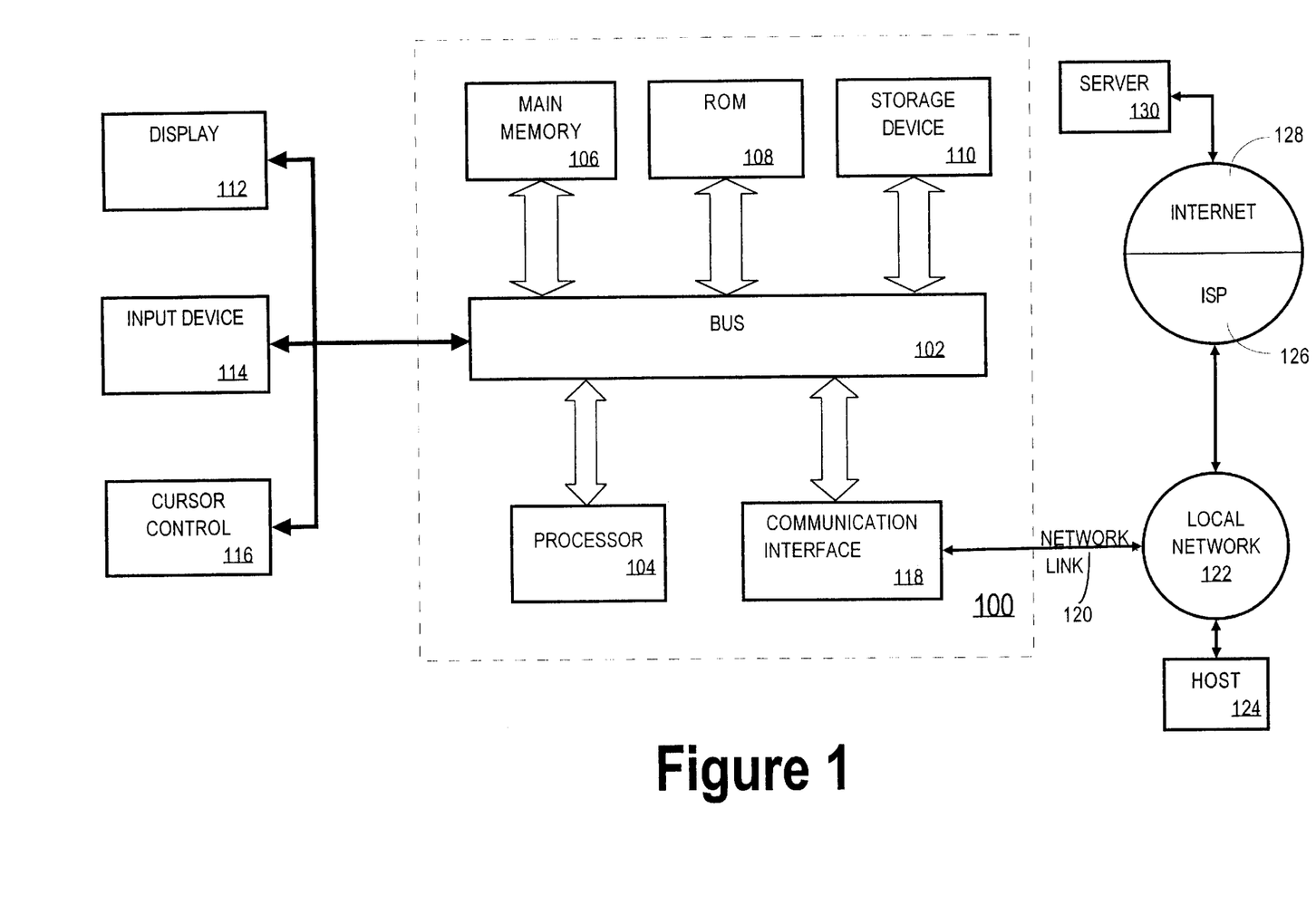
FIG. 1 depicts a computer system that can be used to implement the present invention.

A distributed system comprises a plurality of networked computer systems as nodes. FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for hosting distributed objects. According to one embodiment of the invention, hosting distributed objects is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to non-volatile media, volatile media, and transmission media. Non-volatile media include, for example, optical or magnetic disks, such as storage device 110. Volatile media include dynamic memory, such as main memory 106. Transmission media include coaxial cables, copper wire, and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 10 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for hosting distributed objects as described herein. The received code may be executed by processor 104 as it is received, and/or stored in storage device 110, or other non-volatile storage for later execution. In this manner, computer system 100 may obtain application code in the form of a carrier wave.

GLOBAL HASH FUNCTION TO LOCATE DISTRIBUTED OBJECTS

According to one embodiment of the present invention, distributed objects are located within a distributed system according to the result of applying a global hash function to the respective names of the distributed objects. Although there exists a variety of hash functions that may be employed to locate distributed objects, the present invention is not limited to any particular hash function. According to one approach, the name of the distributed object is partitioned into a sequence of words such as bytes or eight-bit octets and summed together. Other word sizes, such as 16 or 32, can be employed. The resultant sum is divided by a prime number modulus and the remainder is taken. Thereupon, the remainder is divided by the number of nodes in the distributed system to yield a second remainder that identifies a node in the distributed system. More symbolically, the exemplary hash function may be expressed as $h(x) = x \% p \% n$, where x is the summation of partitions of the name, % is the modulus operator (as in the "C" programming language notation), p is the prime modulus, and n is the number of nodes in the distributed system.

Typically, the name of the distributed object encodes system information, e.g. the type of the distributed object, and is therefore lengthy, e.g. at least a dozen characters.

Consequently, the prime modulus p is preferably a large prime such as 1001. For purposes of a simplified explanation, however, an exemplary hash function is illustrated herein with respect to a distributed system having n=6 nodes labeled #0, #1, #2, #3, #4, and #5. In this example, distributed objects have short names, and, hence, a small prime modulus of 31 is appropriate.

For a distributed object with an exemplary name of "FOO," the name comprises three ASCII bytes, which sum to 228. The remainder of 228 divided by 31 is 11, i.e., 228% 31=11. Dividing 11 by 6, the number of nodes, yields a remainder of 5, indicating node #5 in the distributed system. Thus, the distributed object named "FOO" is located and hosted at node #5 with the exemplary hash function. For the distributed object named "BAR," however, the sum of the name is 213, which, when divided by the prime modulus p=31, yields a first remainder of 27. Taking the remainder of 27 modulo n=6, the result is 3, indicating node #3 in the distributed system to host and locate distributed object "BAR."

If node #3 is removed from the distributed system, the hash function changes. According to the above-described approach, the second modulus, which is the number of nodes in the distributed system, changes from 6 to 5. Consequently, the distributed object name of "FOO" now hashes to node #1, since 11 modulo 5 is 1, and the name of distributed object "BAR" hashes to 27 modulo 5, which is 2 for node #2. As another example, if a node #6 is added to the distributed system, then the name "FOO" hashes to 11 modulo 7=4 for node #4, and the name "BAR" hashes to 27 modulo 7=6 for node #6.

Consequently, after a reconfiguration of the distributed system, distributed objects are relocatable according to the application of a newly generated hash function on their names. Thus, the names of distributed objects remain valid after a reconfiguration in contrast to conventional syntactic name resolution techniques. Moreover, the use of a global hash function to locate distributed objects incurs much less overhead than what is involved with conventional attribute clustering techniques, because a large data structure such as a name table need not be maintained.

GENERATING NAMES FOR DISTRIBUTED OBJECTS

Unlike conventional algorithmic clustering strategies, however, the names of the distributed objects are chosen with knowledge of the global hash function, so that the results of hashing the names indicate predetermined nodes in the distributed system. By controlling the naming of distributed objects, distributed objects can be assigned names that will ensure that they are hosted at nodes having affinity to the distributed objects. Thus, distributed objects can be hosted at nodes with less expensive messaging and communications costs.

Figure 2:
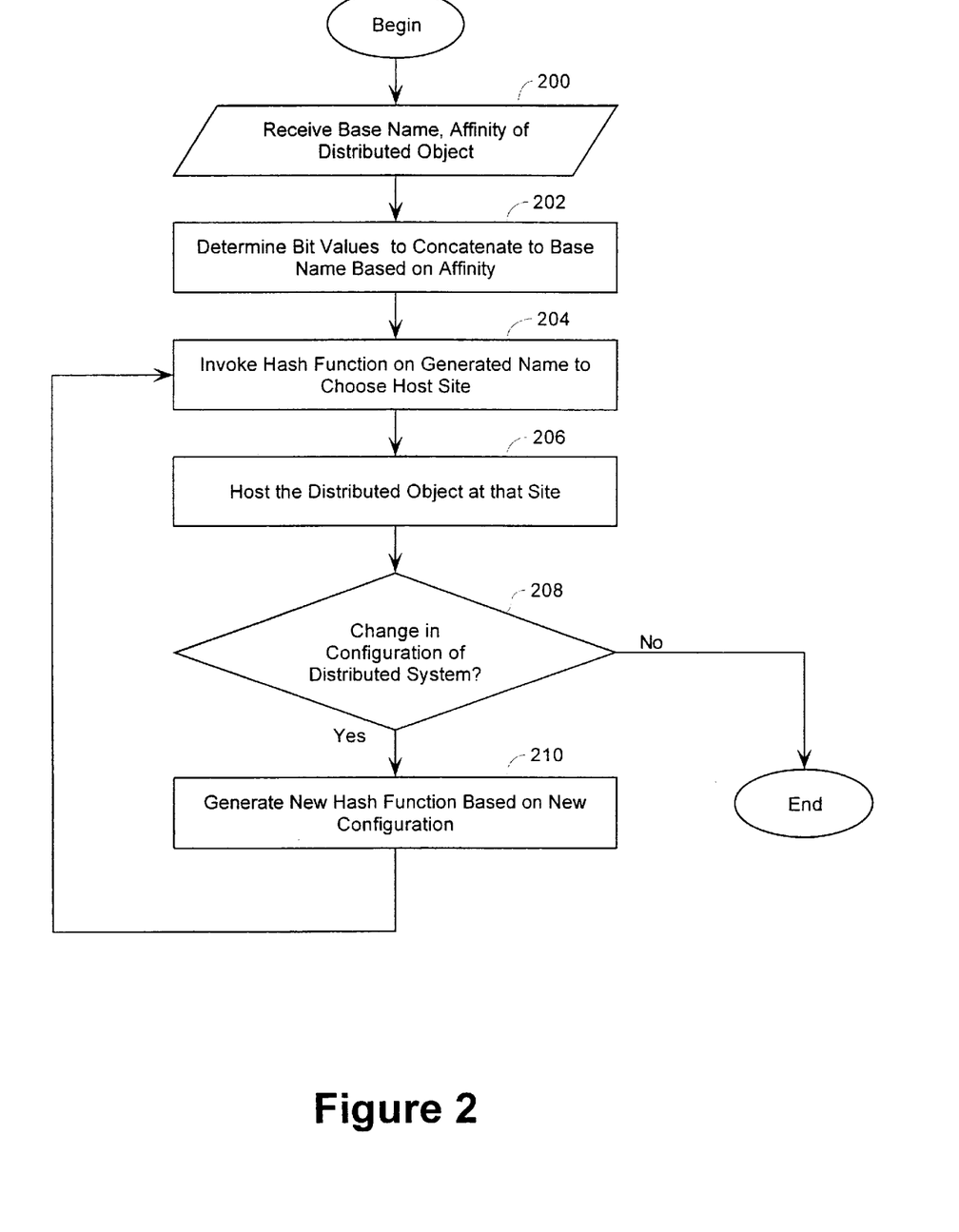
FIG. 2 is a flowchart illustrating a method of hosting a distributed object according to an embodiment of the present invention.

Referring to FIG. 2, it is a flow chart that illustrates the steps of a computer-implemented method for hosting a distributed object according to an embodiment of the present invention. The method may be performed by executing instructions arranged in a computer-readable medium.

In step 200, a base name for a distributed object and a predetermined node for the distributed object are received as input. The input data may be received as parameters to a function, software procedure, library routine, process, or other arrangements of executable or interpreted instructions. The base name is typically chosen to help in the generation of unique names for distributed objects and may include such information as the class or type of the distributed object, a monotonically increasing serial number, or a timestamp. For example, if the distributed object is a printer queue, then base name for each printer queue may employ a prefix of "pq_".

The predetermined node parameter indicates a node in the distributed system having affinity with the distributed object. The determination of which node has an affinity to a distributed object depends closely on the nature of the distributed object. For example, if the distributed object is an executing thread or other program that accesses resources mostly at a particular node in the distributed system, then that node would be chosen as having the most affinity to the thread. Typically, the node that accesses the distributed object the most often is a good choice as the node having affinity.

Subsequently, in step 202, bit values are determined such that the concatenation of those bit values to the base name form a compound name which, when applied to the global hash function, yields a result indicating the predetermined node. The bit values represent one or more numbers that are added to the words that form the base name when computing the hash value for the compound name. If the word size for the base name is eight bits as by the use of ASCII strings, then the bits values represent a sequence of one or more eight-bit values, each from 0 to 255. As another example, if the base name is encoded in an extended character set that can handle Asian characters, such as UNICODE, then the bit values would represent a sequence of one or more 16-bit values. For purposes of illustration, bit values are expressed herein as three octal digits (0–7) following a backslash ('\') in accordance with a standard "C" programming language convention.

In the example of a distributed system with 6 nodes, assume that node #2 is the desired, predetermined node for a distributed object having a base name of "FOO." Since the base name "FOO" sums to 228, the name of "FOO" concatenated with the bit values "\003" sums to 228+3=231. The sum 231 modulo 31 is 14 and, when divided by 6, yields a remainder of 2, indicating node #2. Therefore, the appropriate bit values represent a number congruent to 3 modulo 6 or "\003". Concatenating these bit values with the base name "FOO" generates the name "FOO\003".

On the other hand, if the predetermined node for a distributed object with a base name of "BAR" is node #4, then the generated name would be "BAR\001". As stated either, the sum of "BAR" is 213. Adding the bit values ("\001") representing 1 to 213 yields 214. The remainder of 214 divided by 31 is 28, which, when subsequently divided by 6, yields a second remainder of 4 indicating the predetermined node #4.

The particular method for determining the bit values to concatenate to the base name is highly dependent on the global hash function. If the implementation of the global hash function is known to the name generation function and if the global hash function is simple, then the bit values can determined by a predictive approach based on knowledge of the global hash function. In the example, one family of global hash functions is of the general form h(x) x % p % n, where x is the sum of the base name, p is the prime modulus, n is the number of nodes in the distributed system, and p>n. If the offset between the hash value of the base name and the hash value corresponding to the predetermined node is c, then the bit values to be generated are based on the values of c, p, n, and x. Specifically, the bit values generated will be equal to c, if the term (c+x) % p exceeds the term c%p.

Otherwise, if the term (c+x) % p does not exceed the term c%p, then the bit values generated will be c+p%n. In the example where p=31 and n=6, the base name "BAR" has x=213 and h(213)=3 for node #3. To reach a predetermined node #4, c=1. The term (c+x) %p=(1+213) % 31=28 exceeds the term c%p=213% 31=27, therefore the bit values generated are congruent to c as "\001". Consequently, the generated name for this distributed object is "BAR\001." As another example, to reach the predetermined node #2 (c=5), the term (c+x) %p=(5+213)% 31=1 does not exceed the term c%p=213% 31=27, therefore the bit values generated are congruent to c+p%n=5+31%6=6 or "\006". Thus, the generated name would be "BAR\006".

On the other hand, if the implementation of the global hash function is not known to the name generation logic or if the global hash function is not easily inverted, then a "trial-and-error" approach may be taken. In such an approach, successive bit values are repeatedly generated until a concatenation of the most recent bit values and the base name yields an input into the global hash function, as by calling it repeatedly, that results in the desired output. In the example, first "BAR\000" is tried. If successful, the generated name "BAR\000" is chosen. On the other hand, if unsuccessful, the bit values are incremented to try "BAR\001". The next attempt is "BAR\002" and so forth. Thus, even when the implementation of the global hash function is not known, appropriate bit values can be generated.

One purpose of the base name is to help in the generation of unique names for distributed objects in a distributed system. Generating unique names for distributed objects can be accomplished if the base name is unique, as may be achieved by including serial numbers, timestamps, and unique name space identifiers. If the base name is not unique or if base names are not used, then the name generator for distributed objects is responsible for generating unique names. For example, the name generator can maintain a list of generated names or keep a "high (or low) watermark" value and generate only monotonically increasing (or decreasing) serial numbers for names.

HOSTING DISTRIBUTED OBJECTS

Referring again to FIG. 2, the distributed object is hosted based on the global hash function and the name generated in step 202 from a concatenation of the base name and generated bit values. More specifically, the global hash function is invoked in step 204 to yield a result that indicates the host site in the distributed system for the distributed object. In the example, invoking the global hash function h(x)=x % 31%6, for the generated name "FOO\002", which is a concatenation of base name "FOO" and generated bit values "\002", yields a hash value of #2 indicating node #2 of the exemplary distributed system.

In the step 206, the distributed object is hosted at the node designated by the application of the global hash function. The particular method of hosting the distributed object depends on the nature of the distributed object. For example, if the distributed object is a thread, such as a JAVA agent, then hosting the thread at the designated node entails causing instructions for the thread to be loaded and executed (or interpreted) at the designated node. As another example, a relational database table, which is a body of data organized into rows and columns, can be instantiated and stored in the file system of the designated node. Unlike conventional algorithmic clustering techniques where the name of the distributed object is selected for reasons other than to host the distributed object, the distributed object can be hosted at a predetermined site in order to reduce the costs for sending and receiving network messages.

Unlike conventional attribute clustering techniques, creating distributed objects does not entail the expensive process of updating a (possibly distributed) name table. Any process executing on a node of a distributed system can access a distributed object in the distributed system with the name of the distributed object. In contrast to conventional attribute clustering, the name of the distributed object is resolved into the distributed object by applying the global function to the name instead of by accessing a potentially distributed name table. Consequently, the lower overhead achieved by the present invention with respect to conventional attribute clustering approaches is especially advantageous in distributed system with a large number of distributed objects.

RECONFIGURING THE DISTRIBUTED SYSTEM

In contrast to conventional name clustering techniques, the use of a global hash function enables distributed objects to be relocated in the distributed system without having to update or notify each process using any of the distributed objects. Referring again to FIG. 2 in step 208, a process responsible for managing distributed objects in a distributed system, such as an operating system routine, checks for a change in the configuration of the distributed system. Checking for configuration changes may occur in response to a manual input by a system operator. Such input may be entered, for example, when a new computer (node) is added to the network that implements the distributed system or when a computer (node) is removed from the network. In addition, checking for configuration changes may occur automatically, for example, after waiting for a response from a node for a preset time-out period. If there is no change in the configuration of the distributed system, then the distributed system behaves as normal, including checking for a configuration change (step 208).

On the other hand, if there is a change in the configuration of the distributed system, then step 210 is performed wherein a new global hash function is generated for the new configuration. Since the present invention is not limited to any particular family of hash functions, the way in which step 210 is performed will vary from implementation to implementation. For global hash functions of the form h(x)=x %p % n, where x is the sum of the base name, p is the prime modules, n is the number of nodes in the distributed system, and p>n, the new hash function is generated simply by replacing a new value of n for the old value of n for the number of nodes in the distributed system.

After the new hash function is generated, execution loops back to rehash their formerly generated names with the new hash function (step 204) and, thence, to relocate all the distributed objects to the new hosts in accordance with the results of the new hash function (step 206). Alternatively, only the distributed objects at the removed node are relocated. In this approach, a history of each configuration state, called an "epoch," is maintained. Each epoch is associated with a corresponding hash function, and the overall net hash function is a composition of the hash functions of the relevant epochs. Thus, invoking such as composite hash function involves successively invoking the hash functions corresponding to the epochs. More specifically, the hash function for the first epoch is invoked first to locate the distributed object. Hash functions for subsequent epochs are only invoked to relocate the distributed object if the host node for the distributed object is removed from the configuration of the distributed system. This embodiment is described in more detail in U.S. appl. Ser. No. 09/095,463, entitled "MANAGING ACCESS TO DATA IN A DISTRIBUTED DATABASE ENVIRONMENT" filed on Jun. 10, 1998, by Roger Bamford and Boris Klots incorporated herein by reference. Further changes to the configuration of the distributed system can be detected (step 208), leading to the generation of yet another hash function.

DISTRIBUTED LOCK MANAGER

In the hosting methodology for distributed objects described hereinabove, distributed objects are initially hosted at the node with the most affinity, thereby reducing the networking overhead typical of conventional algorithmic clustering techniques. Furthermore, locating distributed objects does not require the overhead of accessing a potentially distributed name table as in conventional attribute clustering approaches. The above-described hosting methodology, moreover, is resilient because distributed objects can efficiently be relocated after a change in the configuration of the distributed system, unlike conventional name clustering techniques. Accordingly, the present invention provides a resilient and efficient technique for hosting an especially large number of distributed objects.

A reconfiguration in the distributed system causes a change in the global function, and, therefore, distributed objects are no longer necessarily hosted at the same nodes after the reconfiguration. Although some distributed objects may no longer be hosted at the nodes having the most affinity thereto, this potential drawback is insignificant if the distributed objects have short life spans. Therefore, the present invention is particularly beneficial for applications that need to create a large number of short-lived distributed objects, but which are capable of surviving a reconfiguration. One example of such an application is a distributed lock manager.

A distributed lock manager is a networked component that is configured to synchronize access to, and control allocation and modification of, resources in a distributed, relational database system. Any process at any node in the distributed database system that requires a resource protected by the distributed lock manager must acquire a "lock" on that resource. For resilience, fault tolerance, and enhanced runtime performance, instances of the distributed lock manager are distributed among various nodes and maintain portions of a lock database in memory. The lock database records information about which locks are held on which resources. The instance that manages the locks for a particular resource, for example by storing information about the locks in the in-memory lock database, is termed herein the "master instance." After a change in the configuration of the distributed database system, the master instance for each locked resource can be reassigned to another node.

Therefore, a lock on a resource can be considered to be a distributed object, and assigning a master instance for resource locks can be considered as hosting the distributed object at a node. Since a fault-tolerant, relational database system creates and uses a large number of resource locks, which are relatively short-lived but need to survive the failure of their master instance, applications of the present invention has been found to be particularly advantageous for implementing distributed lock managers.

Figure 3:
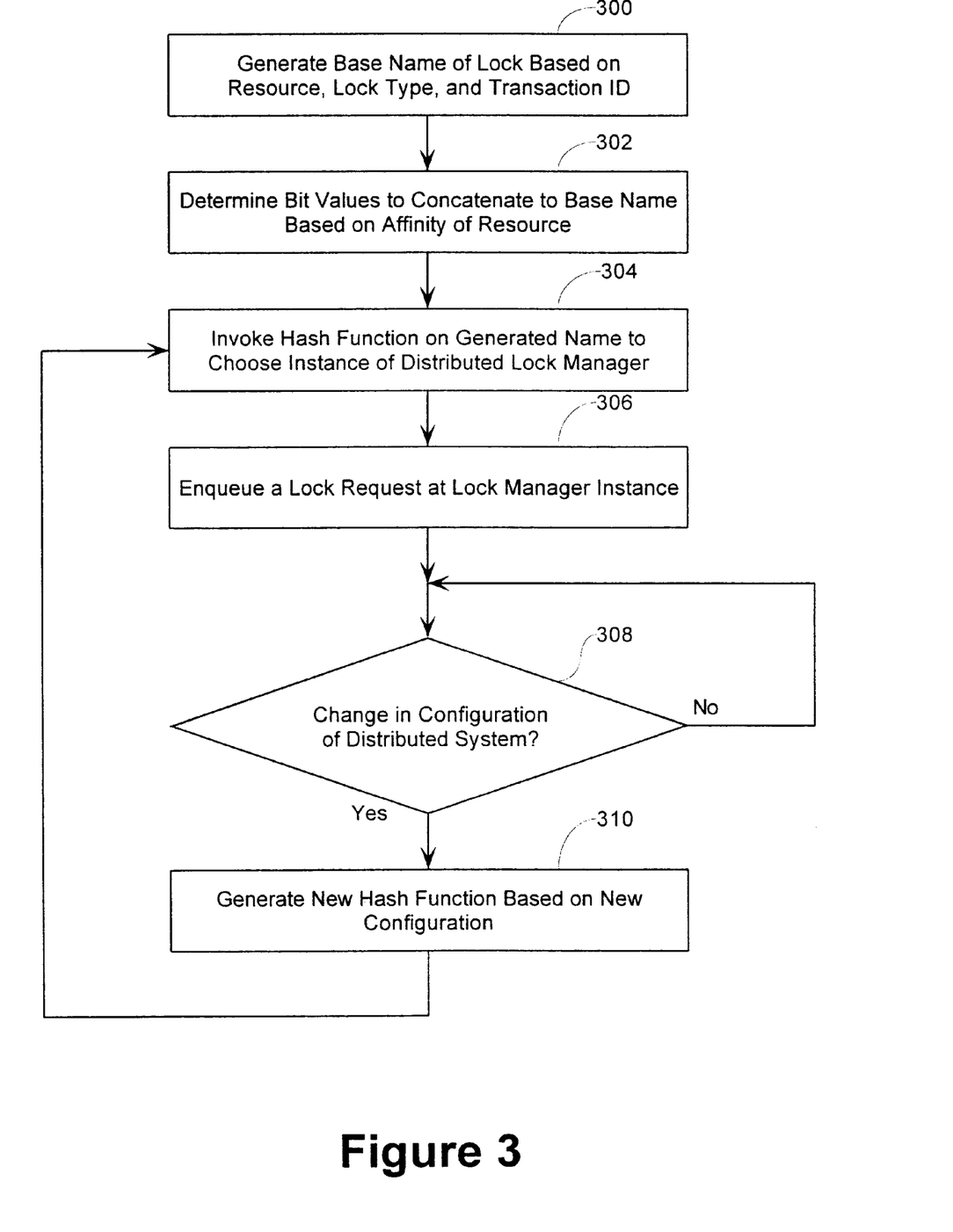
FIG. 3 is a flowchart illustrating a method of locking a resource in a distributed system according to another embodiment of the present invention.

Referring to FIG. 3, in step 300, a base name for a lock is generated based on such factors as the resource to be locked, the type of the lock, and an identifier of the transaction in which the resource is to be locked. Some examples of resources include logical disk blocks such as data blocks and rollback segment blocks. Some lock types or modes can be null node, sub-shared mode, shared-exclusive mode, shared mode, sub-shared exclusive mode, and exclusive mode. The transaction identifier can be a timestamp, a monotonically increasing serial number, or the like. The combination of these factors helps to obtain unique lock names.

In step 302, bit values are determined so that a concatenation of the bit values with the base name generated in step 300, when applied to a global hash function, produces a result that indicates the node in the distributed database system that has an affinity to the locked resource. For example, a node has an affinity to the locked resource if it is the same node of the locked resource and the same node that is executing the process requesting the lock. Sometimes, no node has an affinity to the resource lock, in which case arbitrarily selected bit values, such as zero ("\000"), can be used. The global hash function can be of the form $h(x)=x \% p \% n$, where x is the summation of the base name, p is a large prime modules such as 1001, and n is the number of nodes in the distributed system.

In step 304, the global hash function is invoked upon the concatenation of the base name and the generated bit values to produce a result that indicates which one of the nodes in the distributed system is to manage (or host) the resource lock. When the node to manage the lock is selected by the result of applying the hash function, a lock request containing the lock name is enqueued in the lock manager instance at the selected node. Consequently, the lock request will eventually be dequeued by the lock manager instance and executed to place the lock, if permitted.

If there is a change to the configuration of the distributed database system (detected in step 308), then a new global hash function is generated to reflect the new configuration (step 310). Since the present invention is not limited to any particular family of hash functions, the way in which step 310 is performed will vary from implementation to implementation. For global hash functions of the form $h(x)=x \% p \% n$, for example, the new hash function is generated simply by replacing a new value of n for the number of nodes in the distributed system. After the new hash function is generated, execution loops back to rehash the formerly generated names of the locks with the new hash function (step 304). The locks are then relocated to those lock manager instances on respective nodes in accordance with the results of applying the new hash function (step 306).

While this invention has been described in connection with what is presently considered to be the most practical and preferred embodiments, it is to be understood that the invention is not limited to the disclosed embodiments, but on the contrary, is intended to cover various modifications and equivalent arrangements included within the spirit and scope of the appended claims.

What is claimed is:

1. A method of hosting a distributed object at a predetermined node within a distributed system including a plurality of nodes, said method comprising the computer-implemented steps of:

generating a name for said distributed object such that an invocation of a hash function upon said name indicates that said distributed object is to be hosted at said predetermined node;

hosting said distributed object at said predetermined node based on said hash function and said name for said distributed object.

2. A method as in claim 1, wherein the step of hosting said distributed object at said predetermined node based on said hash function and said name for said distributed object includes the step of invoking said hash function upon said name of said distributed object to indicate said predetermined node.

3. A method as in claim 2, wherein the step of invoking said hash function upon said name of said distributed object includes the step of successively invoking a plurality of hash functions corresponding to respective configurations of said distributed system upon said name.

4. A method as in claim 1, wherein the step of generating a name for said distributed object such that an invocation of a hash function upon said name indicates that said distributed object is to be hosted at said predetermined node includes the steps of:
   determining bit values such that an invocation of said hash function upon a concatenation of a base name for said distributed object and said bit values indicates that that said distributed object is to be hosted at said predetermined node;
   concatenating said base name and said bit values to produce said name for said distributed object.

5. A method as in claim 4, wherein the step of determining said bit values includes the step of predicting said bit values based on knowledge of said hash function, said predetermined node, and said base name.

6. A method as in claim 4, wherein the step of determining said bit values includes the step of repeatedly generating new bit values until an invocation of said hash function upon a concatenation of said base name and said new bit values indicates that that said distributed object is to be hosted at said predetermined node.

7. A method as in claim 6, wherein the step of repeatedly generating said bit values includes the step of incrementing said bit values.

8. A method as in claim 1, further comprising the steps of:
   generating a new hash function in response to a change in a configuration of said distributed system;
   invoking said new hash function upon said name of said distributed object to determine a new node from among said plurality of nodes to host said distributed object; and
   hosting said distributed object at said new node.

9. A method as in claim 8, wherein the step of invoking said new hash function upon said name of said distributed object includes the step of successively invoking a plurality of hash functions corresponding to respective configurations of said distributed system upon said name.

10. A method as in claim 8, wherein
   the step of generating a new hash function in response to a change in a configuration of said distributed system includes the step of generating said new hash function in response to a removal of said predetermined node from said distributed system; and
   the step of invoking said new hash function upon said name of said distributed object to determine a new node from among said plurality of nodes to host said distributed object includes the step of invoking said new hash function upon said name of said distributed object to determine a new node other than said predetermined node to host said distributed object.

11. A method of locking a resource within a networked, relational database system including a plurality of nodes, said method comprising the computer-implemented steps of:
   determining a selected node from among said plurality of nodes;
   generating a name for a lock for said resource such that an invocation of a hash function upon said name indicates an instance of a distributed lock manager at said selected node;
   enqueuing a lock request containing said name in said instance of said distributed lock manager based on said hash function and said name.

12. A method as in claim 11, wherein the step of enqueuing a lock request containing said name in said instance of said distributed lock manager based on said hash function and said name includes the step of invoking said hash function upon said name to indicate said selected node.

13. A method as in claim 12, wherein the step of invoking said hash function upon said name includes the step of successively invoking a plurality of hash functions corresponding to respective configurations of said distributed system upon said name.

14. A method as in claim 11, wherein the step of generating a name for a lock for said resource such that an invocation of a hash function upon said name indicates an instance of a distributed lock manager at said selected node includes the steps of:
   generating a base name for said lock;
   determining bit values such that an invocation of said hash function upon a concatenation of said base name and said bit values indicates said instance of said distributed lock manager;
   concatenating said base name and said bit values to produce said name.

15. A method as in claim 14, wherein the step of generating a base name for said lock includes the step of generating said base name based on said resource and a transaction identifier.

16. A method as in claim 14, wherein the step of determining said bit values includes the step of predicting said bit values based on said hash function, said location and said base name.

17. A method as in claim 14, wherein the step of determining said bit values includes the step of repeatedly generating new bit values until an invocation of said hash function upon a concatenation of said base name and said new bit values indicates said instance of said distributed lock manager.

18. A method as in claim 17, wherein the step of repeatedly generating said bit values includes the step of incrementing said bit values.

19. A method as in claim 11, further comprising the steps of:
   generating a new hash function in response to a change in a configuration of said networked, relational database system;
   invoking said new hash function upon said name to determine a new node from among said plurality of nodes; and
   enqueuing a new lock request containing said same at a new instance of said distributed lock manager at said new node.

20. A method as in claim 19, wherein the step of invoking said new hash function upon said name includes the step of successively invoking a plurality of hash functions corresponding to respective configurations of said distributed system upon said name.

21. A method as in claim 19, wherein
   the step of generating a new hash function in response to a change in a configuration of said networked, relational database system includes the step of generating said new hash function in response to a removal of said location from said networked, relational database system; and the step of invoking said new hash function upon said name to determine a new node from among said plurality of nodes to includes the step of invoking said new hash function upon said name to determine a new node other than said selected node.

22. A computer-readable medium bearing instructions for hosting a distributed object at a predetermined node within a distributed system including a plurality of nodes, said instructions arranged to cause one or more processors to perform the steps of:

generating a name for said distributed object such that an invocation of a hash function upon said name indicates that said distributed object is to be hosted at said predetermined node;

hosting said distributed object at said predetermined node based on said hash function and said name for said distributed object.

23. A computer-readable medium as in claim 22, wherein the step of hosting said distributed object at said predetermined node based on said hash function and said name for said distributed object includes the step of invoking said hash function upon said name of said distributed object to indicate said predetermined node.

24. A computer-readable medium as in claim 23, wherein the step of invoking said hash function upon said name includes the step of successively invoking a plurality of hash functions corresponding to respective configurations of said distributed system upon said name.

25. A computer-readable medium as in claim 22, wherein the step of generating a name for said distributed object such that an invocation of a hash function upon said name indicates that said distributed object is to be hosted at said predetermined node includes the steps of:

determining bit values such that an invocation of said hash function upon a concatenation of a base name for said distributed object and bit values indicates that that said distributed object is to be hosted at said predetermined node;

concatenating said base name and said bit values to produce said name for said distributed object.

26. A computer-readable medium as in claim 25, wherein the step of determining said bit values includes the step of predicting said bit values based on knowledge of said hash function, said predetermined node, and said base name.

27. A computer-readable medium as in claim 25, wherein the step of determining said bit values includes the step of repeatedly generating new bit values until an invocation of said hash function upon a concatenation of said base name and said new bit values indicates that that said distributed object is to be hosted at said predetermined node.

28. A computer-readable medium as in claim 27, wherein the step of repeatedly generating said bit values includes the step of incrementing said bit values.

29. A computer-readable medium as in claim 22, wherein said instructions are further arranged to cause said one or more processors to perform the steps of:

generating a new hash function in response to a change in a configuration of said distributed system;

invoking said new hash function upon said name of said distributed object to determine a new node from among said plurality of nodes to host said distributed object; and hosting said distributed object at said new node.

30. A computer-readable medium as in claim 29, wherein the step of invoking said hash function upon said name includes the step of successively invoking a plurality of hash functions corresponding to respective configurations of said distributed system upon said name.

31. A computer-readable medium as in claim 29, wherein the step of generating a new hash function in response to a change in a configuration of said distributed system includes the step of generating said new hash function in response to a removal of said predetermined node from said distributed system; and the step of invoking said new hash function upon said name of said distributed object to determine a new node from among said plurality of nodes to host said distributed object includes the step of invoking said new hash function upon said name of said distributed object to determine a new node other than said predetermined node to host said distributed object.

32. A computer-readable medium bearing instructions for locking a resource within a networked, relational database system including a plurality of nodes, said instructions arranged to cause one or more processors to perform the steps of:

determining a selected node from among said plurality of nodes;

generating a name for a lock for said resource such that an invocation of a hash function upon said name indicates an instance of a distributed lock manager at said selected node;

enqueuing a lock request containing said name in said instance of said distributed lock manager based on said hash function and said name.

33. A computer-readable medium as in claim 32, wherein the step of enqueuing a lock request containing said name in said instance of said distributed lock manager based on said hash function and said name includes the step of invoking said hash function upon said name to indicate said selected node.

34. A computer-readable medium as in claim 33, wherein the step of invoking said hash function upon said name includes the step of successively invoking a plurality of hash functions corresponding to respective configurations of said distributed system upon said name.

35. A computer-readable medium as in claim 32, wherein the step of generating a name for a lock for said resource such that an invocation of a hash function upon said name indicates an instance of a distributed lock manager at said selected node includes the steps of:

generating a base name for said lock;

determining bit values such that an invocation of said hash function upon a concatenation of said base name and said bit values indicates said instance of said distributed lock manager;

concatenating said base name and said bit values to produce said name.

36. A computer-readable medium as in claim 35, wherein the step of generating a base name for said lock includes the step of generating said base name based on said resource and a transaction identifier.

37. A computer-readable medium as in claim 35, wherein the step of determining said bit values includes the step of predicting said bit values based on said hash function, said location and said base name.

38. A computer-readable medium as in claim 35, wherein the step of determining said bit values includes the step of repeatedly generating new bit values until an invocation of said hash function upon a concatenation of said base name and said new bit values indicates said instance of said distributed lock manager.

39. A computer-readable medium as in claim 38, wherein the step of repeatedly generating said bit values includes the step of incrementing said bit values.

40. A computer-readable medium as in claim 32, further comprising the steps of:

generating a new hash function in response to a change in a configuration of said networked, relational database system;

invoking said new hash function upon said name to determine a new node from among said plurality of nodes; and enqueuing a new lock request containing said same at a new instance of said distributed lock manager at said new node.

41. A computer-readable medium as in claim 40, wherein the step of invoking said hash function upon said name includes the step of successively invoking a plurality of hash functions corresponding to respective configurations of said distributed system upon said name.

42. A computer-readable medium as in claim 40, wherein the step of generating a new hash function in response to a change in a configuration of said networked, relational database system includes the step of generating said new hash function in response to a removal of said location from said networked, relational database system; and the step of invoking said new hash function upon said name to determine a new node from among said plurality of nodes to includes the step of invoking said new hash function upon said name to determine a new node other than said selected node.

* * * * *